United States Patent [19]

Cooper, Jr. et al.

[11] Patent Number: 4,586,079
[45] Date of Patent: Apr. 29, 1986

[54] FIBERSCOPE DELIVERY SYSTEM

[75] Inventors: Frank W. Cooper, Jr., Monroeville; Harry N. Andrews, Murrysville, both of Pa.; Matthew J. Randazzo, Tonawanda, N.Y.

[73] Assignee: Westinghouse Electric Corp., Pittsburgh, Pa.

[21] Appl. No.: 540,454

[22] Filed: Oct. 7, 1983

[51] Int. Cl.$^4$ .............................................. H04N 7/18
[52] U.S. Cl. ...................................... 358/100; 226/88; 254/134.3 FT; 354/63; 356/241; 358/98; 358/901
[58] Field of Search ......................... 358/100, 98, 901; 254/134.3 R, 134.3 FT, 134.7; 271/188, 209; 227/77; 226/76, 88; 356/237, 241; 354/63

[56] References Cited

U.S. PATENT DOCUMENTS

| | | | |
|---|---|---|---|
| 3,799,418 | 3/1974 | Maroschak | 226/76 |
| 3,852,527 | 12/1974 | McQuivey | 358/100 |
| 4,092,780 | 6/1978 | Trethwey | 254/134.3 FT |
| 4,277,168 | 7/1981 | Oku | 356/241 |
| 4,340,302 | 7/1982 | Oku | 356/241 |

Primary Examiner—Howard W. Britton
Attorney, Agent, or Firm—L. A. DePaul

[57] ABSTRACT

A fiberscope inspection system for a nuclear steam generating plant includes an optical unit and a transport unit respectively coupled to opposite ends of the fiberoptic cable and mounted at spaced-apart points on a trolley beneath the tube sheet, with the fiberoptic cable hanging freely in a catenary between the two units, both of which are coupled by cable to a remote control station. The optical unit is self-contained and includes a light source, a video camera and a focusing mechanism and chain and sprocket remotely-controlled drive means for controlling the focusing mechanism. The transport unit includes a cartridge comprising a coil of a steel drive tape, the leading end of which is welded to a split-sleeve coupling disposed in clamping engagement with the leading end of the fiberoptic cable, the tape being engageable by a drive sprocket for driving same to feed and retract the fiberoptic cable. Position sensing means are provided for monitoring the position of the fiberscope probe.

20 Claims, 17 Drawing Figures

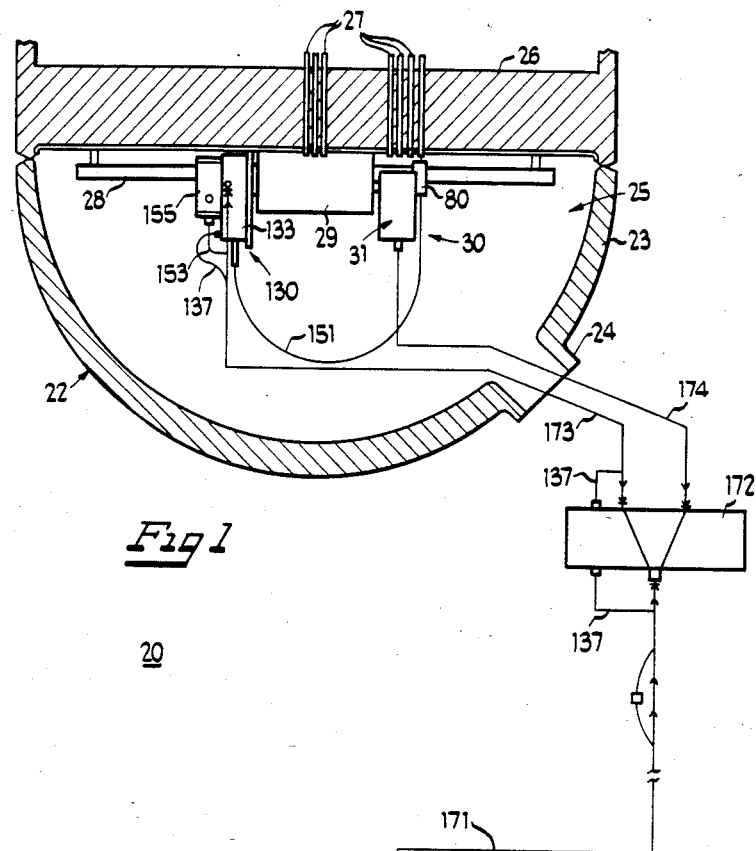
Fig 1
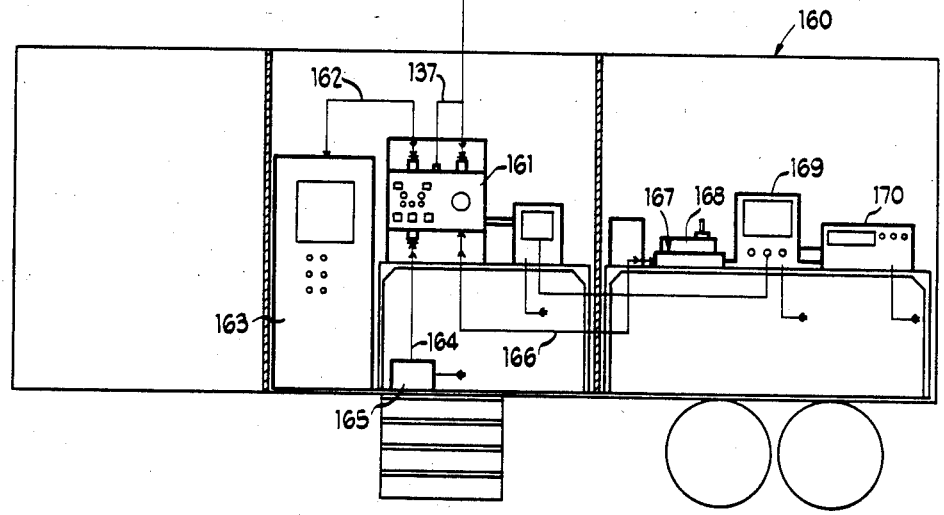

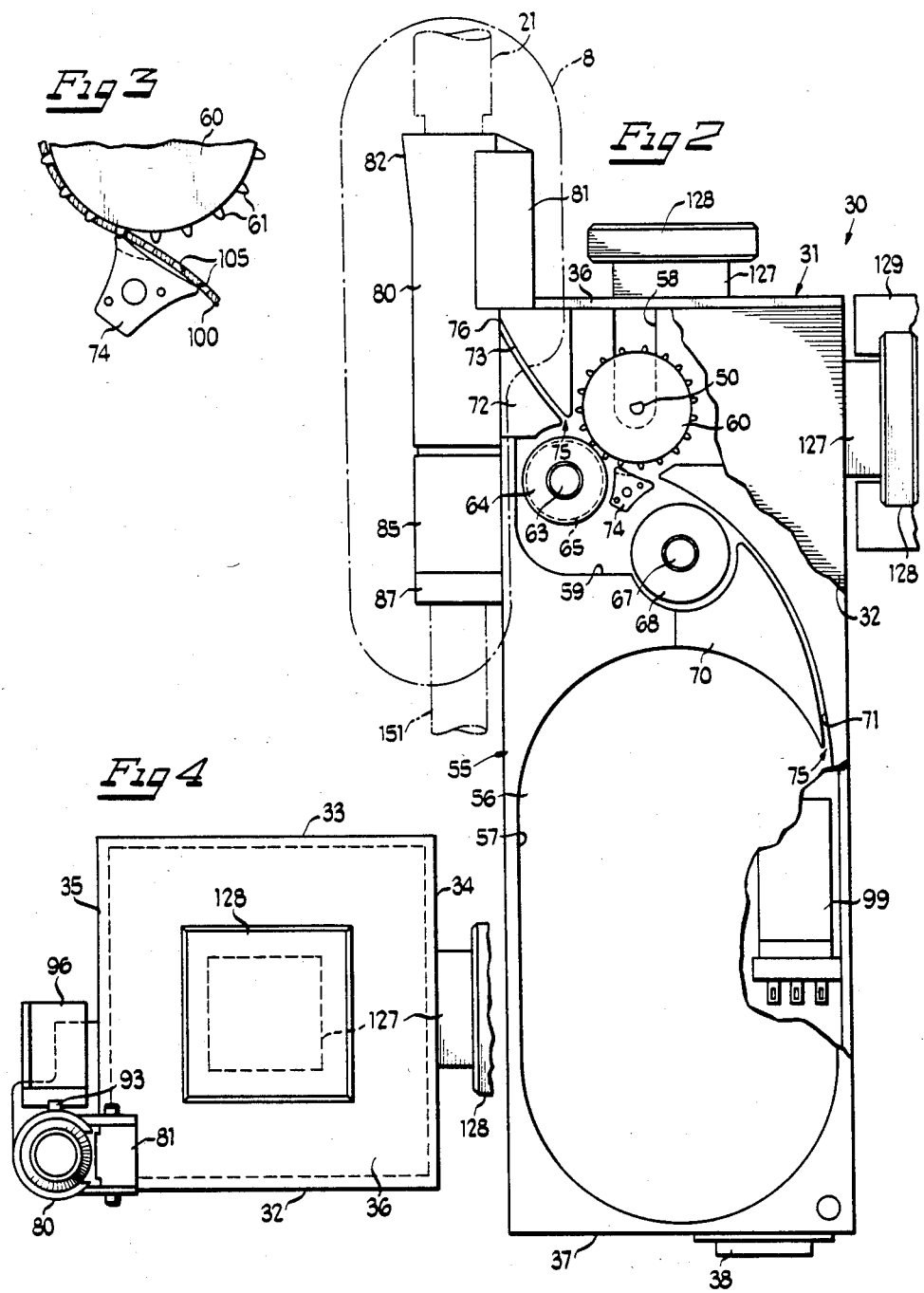

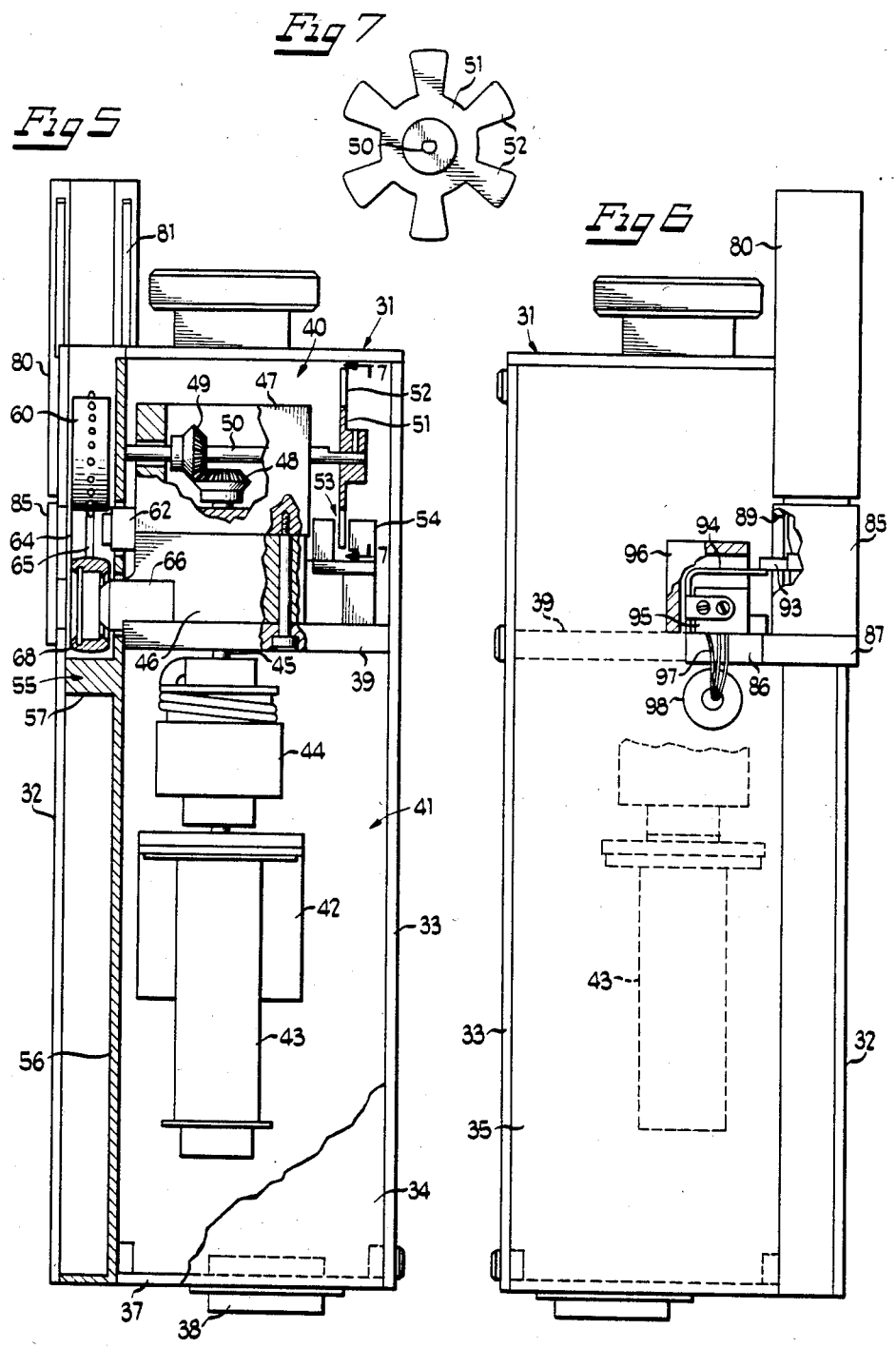

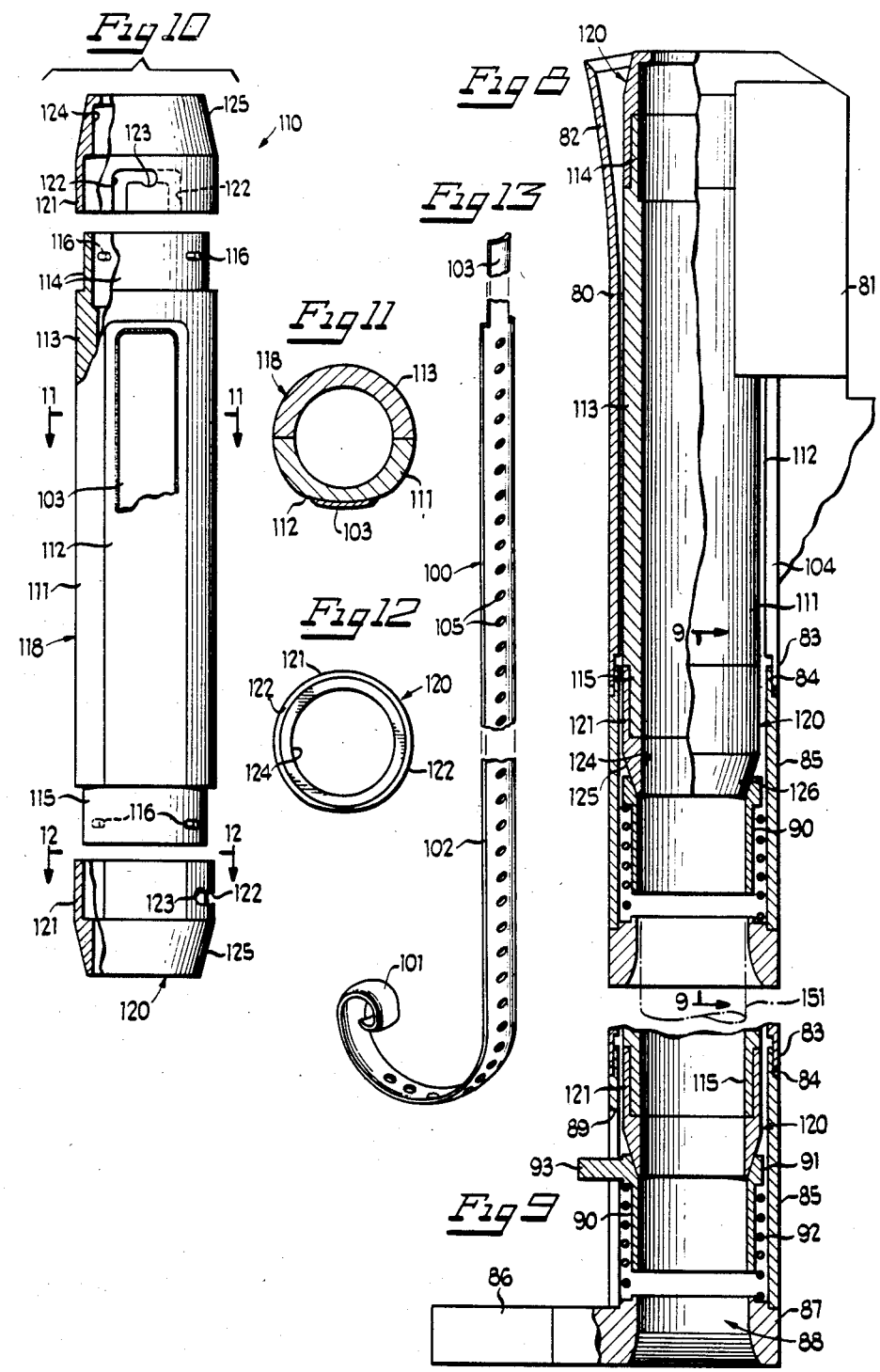

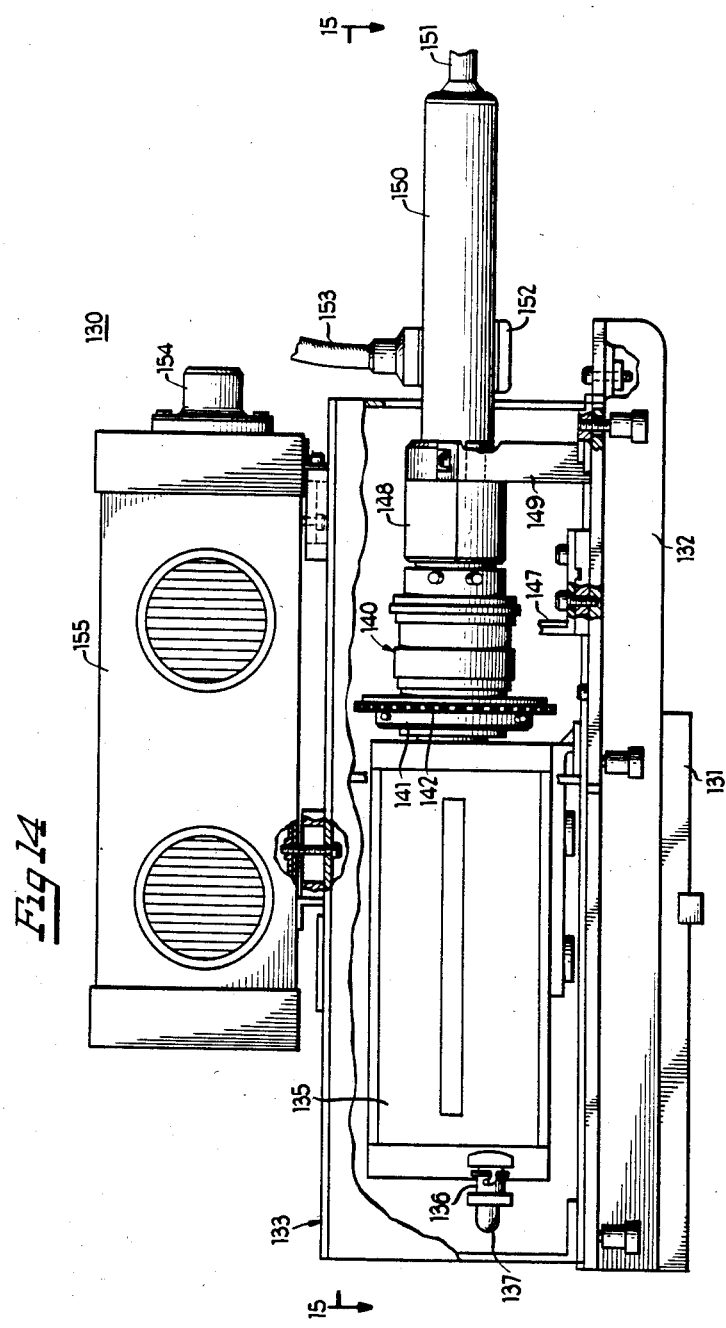

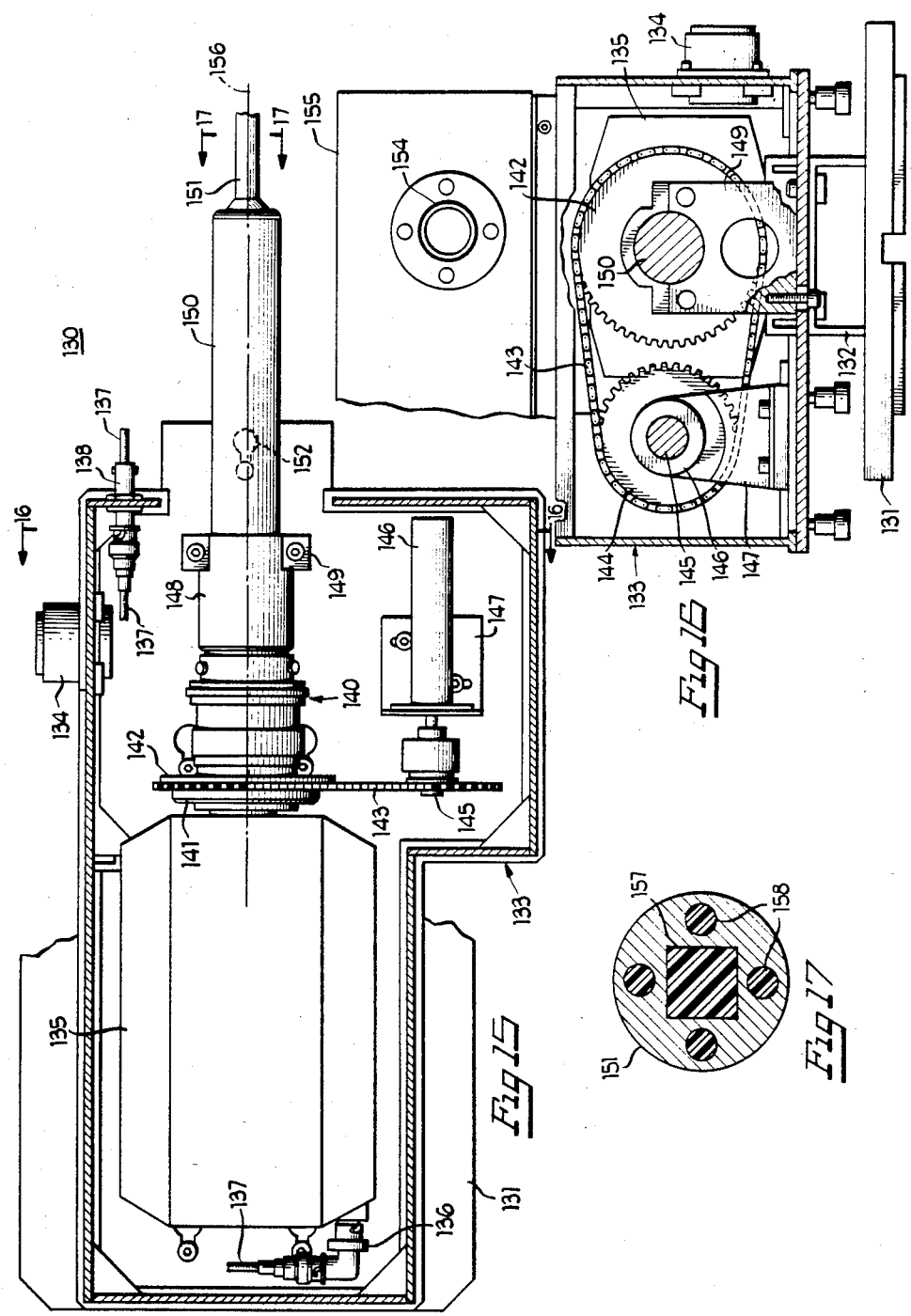

FIBERSCOPE DELIVERY SYSTEM

BACKGROUND OF THE INVENTION

The present invention relates to systems for delivering workpieces, such as inspection probes, to and from work areas. The invention more specifically relates to a delivery system for a fiberoptic inspection apparatus, and has particular application to inspection systems for nuclear steam generating plants.

A nuclear steam generator contains many vertical tubes aligned by rows and columns in close relationship to each other. A primary fluid having been heated by circulation through the nuclear reactor core, is circulated through the tubes. At the same time, a secondary fluid, known as feedwater, is circulated around the tubes in heat transfer relationship therewith, thereby transferring heat from the primary fluid in the tubes to the secondary fluid surrounding the tubes, causing a portion of the secondary fluid to be converted to steam.

Isolation of the radioactive primary fluid from the secondary fluid in a nuclear steam generator is critical. Accordingly, test procedures have been developed to test the integrity of the generator tubes. One such procedure is an inspection process, wherein a probe is inserted into a tube and retracted from it at a constant rate. In the event that defects are located in the tube, such defects may be corrected by sleeving, i.e., mounting an auxiliary tube inside the defective tube to span the defective region, thereby returning the tube to its normal heat transfer capacity.

In both the inspection process and in the sleeving process, a fiberscope may be utilized for direct viewing of the inside of the tube. A fiberscope comprises an elongated fiberoptic cable having a probe at one end thereof and having the other end coupled to a light source and to a camera. Light travels through the cable and the probe to the inside of the tube, the reflected light then traveling back up the cable to the TV camera.

Typically, the fiberscope probe is delivered into and retracted from the tubes by a frictional drive mechanism. Such drive mechanisms may comprise, for example, a plurality of driven rollers disposed in frictional engagement with the fiberoptic cable to impart a linear movement thereto. This drive mechanism provides a slippage clutching action in the event that the probe contacts an obstruction which impedes its passage. A problem with this type of drive mechanism is the frictional wear on the fiberoptic cable, as well as on the drive rollers. Furthermore, the drive mechanism is typically rather complicated, utilizing a large number of gears, bearings, ratchet drives, sprockets and the like which results in large physical size and weight, complicated and expensive construction and expensive and time consuming maintenance.

Another drawback of this frictional type of drive mechanism is that the slippage which occurs between the drive rollers and the fiberoptic cable prevents the measurement of probe movement by measuring the movement of the drive rollers. Thus, separate means must be provided for accurately determining the position of the probe.

Another difficulty with prior fiberoptic inspection systems is that the system is only intermittently available. This is because each operation of the delivery mechanism requires the presence of operating personnel at the containment vessel, resulting in exposure to radiation. Furthermore, the camera and light source are typically mounted independently of the delivery mechanism, either adjacent to the containment vessel, risking radiation exposure to the operators, or remotely located necessitating long fiberoptic cables and remote communication between the operator at the TV monitor and the operator at the containment vessel.

SUMMARY OF THE INVENTION

It is a general object of the present invention to provide an improved fiberoptic inspection delivery system which avoids the disadvantages of prior systems, while affording additional structural and operating advantages.

An important object of this invention is the provision of a workpiece drive apparatus which drives a flexible workpiece carrier while avoiding frictional wear on the carrier.

In connection with the foregoing object, it is another object of this invention to provide a drive apparatus of the type set forth, which permits accurate measurement of workpiece position by measuring movement of the drive apparatus.

Still another object of this invention is the provision of drive apparatus of the type set forth, which is of simple and economical construction and is compact in size.

Yet another object of this invention is the provision of a fiberscope inspection system which incorporates drive apparatus of the type set forth.

In connection with the foregoing object, it is still another object of this invention to provide a fiberscope inspection system which is continuously available for use without operator exposure to radiation.

In connection with the foregoing objects, still another object of the invention is the provision of a fiberoptic inspection system of the type set forth, which is continuously disposed in the containment vessel of a nuclear steam generator, and is remotely controllable.

In connection with the foregoing objects, it is another object of the invention to provide a fiberoptic inspection system of the type set forth, wherein the light source, image processing means and image focusing means are all disposed in a self-contained optical unit.

These and other objects of the invention are attained by providing apparatus for driving an elongated flexible carrier for carrying a workpiece to and from work areas, the apparatus comprising: an elongated drive member having rigidity in one plane and being bendable out of the plane, coupling means carried by the drive member adjacent to one end thereof for coupling the drive member to the associated workpiece carrier, and drive means engageable with the drive member for effecting longitudinal movement thereof and of the carrier coupled thereto; thereby to drive the carrier and the associated workpiece along a linear path.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a view in partial vertical section of a fiberoptic inspection system, constructed in accordance with and embodying the features of the present invention, with the system illustrated in use for inspection of the tubes of a nuclear steam generating plant;

FIG. 2 is an enlarged, front elevational view of a transport unit of the system of FIG. 1, with portions broken away more clearly to illustrate the construction;

FIG. 3 is a further enlarged, fragmentary view of the tape drive sprocket of the transport unit of FIG. 2, illustrated attached to an associated support;

FIG. 4 is a top plan view of the transport unit of FIG. 2;

FIG. 5 is a side elevational view of the transport unit of FIG. 2, as viewed from the right-hand side thereof, with portions broken away and in partial vertical section;

FIG. 6 is a side elevational view of the transport unit of FIG. 2, as viewed from the left-hand side thereof, with portions broken away;

FIG. 7 is a view of the travel sensing vane of the transport unit, taken generally along the line 7—7 in FIG. 5;

FIG. 8 is a further enlarged, fragmentary view of the guide tube of the transport unit of FIG. 2, in partial vertical section;

FIG. 9 is a fragmentary view in vertical section taken along the line 9—9 in FIG. 8;

FIG. 10 is an exploded view of the tape clamp assembly of the present invention, in partial vertical section;

FIG. 11 is a view in horizontal section taken along the line 11—11 in FIG. 10;

FIG. 12 is a top plan view taken along the line 12—12 in FIG. 10;

FIG. 13 is a perspective view of the drive tape of the present invention, with portions removed;

FIG. 14 is a side elevational view of the optical unit of the present invention, with portions broken away more clearly to show the internal construction;

FIG. 15 is a view in horizontal section taken along the line 15—15 in FIG. 14;

FIG. 16 is a fragmentary view in vertical section taken along the line 16—16 in FIG. 15; and FIG. 17 is an enlarged view in vertical section, taken along the line 17—17 in FIG. 15.

DESCRIPTION OF THE PREFERRED EMBODIMENT

Referring to FIGS. 1 and 2 of the drawings, there is illustrated a fiberoptic inspection system, generally designated by the numeral 20, for controlling the movement of a fiberscope probe 21 (see FIG. 2) within a nuclear steam generator vessel 22 and for processing the optical data collected by the probe 21. The fiberoptic inspection system 20 includes a fiberoptic cable 151 coupled to a transport unit 30 for effecting linear movement thereof, and coupled at one end to an optical unit 130. The transport unit 30 and the optical unit 130 are both adapted to be mounted along with the fiberoptic cable 150 within the nuclear steam generator vessel 22 and to be connected by suitable cabling to a remotely located control trailer 160.

The nuclear steam generator vessel 22 includes a wall 23 having a manway 24 therethrough to provide access to a primary chamber 25, which is separated by a tube sheet 26 from a upper secondary chamber. Disposed in the secondary chamber and extending through complementary openings in the tube sheet 26 for communication with the primary chamber 25 is a tube bundle comprising a plurality of tubes 27, in a known manner. For purposes of conducting the fiberoptic inspection process, there is mounted on the bottom of the tube sheet 26 an elongated support rail 28, on which is mounted a trolley 29 for movement longitudinally of the rail 28 beneath the lower ends of the tubes 27. The transport unit 30 and the optical unit 130 are both adapted to be fixedly mounted on the trolley 29 for movement therewith, with the fiberoptic cable 151 extending between the transport unit 30 and the optical unit 130, completely within the primary chamber 25.

Referring now also to FIGS. 3–7, the transport unit 30 includes a generally box-like rectangular enclosure 31, having opposed front and rear walls 32 and 33 and opposed side walls 34 and 35, all interconnected by a top wall 36 and a bottom wall 37. A cable connector 38 is mounted in the bottom wall 37 for connection to a control cable, as will be explained more fully below. A partition 39 is disposed in the enclosure 31 parallel to the top and bottom walls 36 and 37 for separating the interior of the enclosure 31 into a upper chamber 40 and a lower chamber 41 (see FIG. 5).

Disposed in the lower chamber 41 and secured to the side wall 35 in a mounting bracket 42 supporting thereon a reversible, electric planetary gear motor 43 having the output shaft thereof disposed substantially perpendicular to the top and bottom walls 36 and 37 and coupled to a slip coupling 44. The output shaft 45 of the slip coupling 44 extends upwardly through the partition 39 and a bearing block 46 in the upper chamber 40 into a gear box 47. More specifically, the shaft 45 is fixedly coupled to a miter gear 48 which is disposed in meshing engagement with a miter gear 49 fixedly secured to a shaft 50 which is disposed substantially perpendicular to the shaft 45. The opposite ends of the shaft 50 project outwardly from the gear box 47, the rear end of the shaft 50 being fixedly secured to the hub of a generally circular vane 51 coaxially therewith (see FIGS. 5 and 7). The vane 51 has a plurality of radially outwardly extending arms 52 equiangularly spaced apart therearound and disposed for passage through a slot 53 in a Hall-effect sensor 54 mounted in the upper chamber 40.

Mounted in the enclosure 31 immediately behind the front wall 32 is a cartridge 55 which comprises a relatively thick rectangular plate 56 having a large oval recess formed in the front face thereof, for cooperation with the front wall 32 to define a magazine compartment 57. Formed in the upper edge of the plate 56 and extending longitudinally thereinto is an elongated U-shaped slot 58 (see FIG. 2) for accommodating the front end of the shaft 50. The slot 58 communicates with another large irregular recess 59 in the front surface of the plate 56, in which is disposed a drive sprocket 60 which is fixedly secured to the front end of the shaft 50 coaxially therewith. The sprocket 60 is provided with a plurality of drive teeth or pins 61 (FIG. 3) extending radially outwardly therefrom and equiangularly spaced apart around the circumference thereof. Mounted in the upper chamber 40 is a bearing 62 which extends forwardly through a complementary opening in the plate 56 and in which is journaled a shaft 63 on the forward end of which is mounted an idler wheel 64 disposed in the recess 59. The idler wheel 64 has a circumferential groove 65 formed in the outer surface thereof for accommodating the sprocket teeth 61, as will be explained more fully below. Also mounted in the upper chamber 40 is a bearing 66 which also extends through a complementary opening in the plate 56 and in which is journaled a shaft 67, having secured to the front end thereof another idler wheel 68 disposed in the recess 59.

Mounted on the plate 56 between the recesses 57 and 59 is a guide member 70 having an arcuate guide surface which is spaced from and cooperates with a complementary guide surface 71 on the plate 56 for defining an entry portion of a narrow slot-like path 75 leading from the magazine compartment 57. Another guide member 72 is mounted on the plate 56 in the recess 59 for cooperation with a guide surface 73 on the plate 56 for defining an exit end of the path 75. Another guide member 74 cooperates with the drive sprocket 60 to define an intermediate portion of the path 75. Thus, as is best illustrated in FIG. 2, the path 75 extends from the magazine compartment 57, over the idler wheel 68, between the guide member 74 and the drive sprocket 60, between the drive sprocket 60 and the idler wheel 64 and thence over the guide surface 73 to an exit aperture 76 which leads into a cylindrical guide tube 80 mounted on the side wall 35 of the enclosure 31.

Referring now also to FIGS. 8-13 of the drawings, the guide tube 80 is supported on a mounting bracket 81 and extends upwardly parallel to the side wall 35 well beyond the top wall 36. The guide tube 80 is substantially circular in transverse cross section through most of its length, but is provided with an outwardly flared upper end 82. At its lower end, the guide tube 80 has a reduced thickness to define a cylindrical flange 83 (see FIG. 8) which is disposed in overlapping telescoping relationship with a reduced thickness flange 84 on the upper end of a cylindrical actuator tube 85. The lower end of the actuator tube 85 is seated on an annular mounting ring 87, coaxially therewith, the ring 87 forming a part of a mounting bracket 86 which is mounted on the enclosure 31 (see FIG. 9).

The mounting ring 87 defines a bore 88 therethrough with an outwardly flared lower end, the bore 88 being disposed in coaxial registry with a cylindrical thimble 90 having an outer diameter less than the inner diameter of the actuator tube 35 and disposed coaxially therewithin. The thimble 90 has an enlarged-diameter annular flange 91 at its upper end which provides a bearing surface for the upper end of a helical compression spring 92 which is seated on the mounting ring 87 in surrounding relationship with the thimble 90. Integral with the annular flange 91 and extending radially outwardly therefrom through an elongated axial slot 89 in the side wall of the actuator tube 85 is an arm 93 which is disposed for engagement with a leaf spring actuator 94 of a switch 95 (see FIG. 6). The switch 95 is disposed in a housing 96 carried by the side wall 35 of the enclosure 31, the switch control wires 97 extending through a circular grommet 98 in the side wall 35 for connection to a control relay 99 (see FIG. 2) mounted in the lower chamber 41 of the enclosure 31.

Disposed in the magazine compartment 57 of the cartridge 55 is an elongated flexible drive tape 100 (see FIG. 13), which is preferably formed of stainless steel. The drive tape 100 is a thin flattened tape, which preferably has a slight transverse curvature, so that the tape 100 is slightly arcuate in transverse cross section (see FIG. 11). This gives the drive tape 100 substantial rigidity in a lateral plane, while still permitting it to be bent out of that plane. This slightly arcuate cross section also gives the drive tape 100 substantial strength and rigidity when it is placed in longitudinal compression, as a column. The drive tape 100 has a curled inner end 101 which facilitates its being rolled into a coil within the magazine compartment 57. Extending from the curled end 101 is an elongated supply portion 102 terminating at a reduced-width leading or attachment end 103. The supply portion 102 of the tape 100 has a row of equidistantly spaced-apart circular holes 105 therethrough extending longitudinally thereof centrally thereof.

In use, the drive tape 100 is rolled into a coil within the magazine compartment 57, the leading end 103 thereof being fed along the path 75, over the idler wheel 68 and the guide member 74 and thence between the drive sprocket 60 and the idler wheel 64. In this regard, the spacing between the outer surfaces of the drive sprocket 60 and the idler wheel 64 is only very slightly greater than the thickness of the drive tape 100. The drive teeth 61 of the drive sprocket 60 respectively extend through the holes 105 in the drive tape 100 and thence into the groove 65 in the idler wheel 64. The drive sprocket 60 thus engages the drive tape 100 for effecting linear movement thereof in response to rotational movement of the drive sprocket 60. The drive tape 100 is then fed through the exit portion of the path 75 and the aperture 76 through a rectangular slot 104 in the guide tube 80 (see FIG. 8) to the interior thereof, at which point the attachment end 103 of the drive tape 100 is fixedly secured to a clamp assembly 110.

Referring in particular to FIGS. 10-12, the clamp assembly 110 includes two mating elongated semicylindrical barrel members 111 and 113 which mate to form a cylindrical barrel 118. The outer surface of one of the barrel members 111 has an elongated flattened portion 112 thereon to which the attachment end 103 of the drive tape 100 is fixedly secured, as by welding. The cylindrical barrel 118 has an outer diameter slightly less than the inner diameter of the guide tube 80, so that the barrel 118 is telescopically receivable in the guide tube 80 coaxially therewith, as is best illustrated in FIGS. 8 and 9. Each of the barrel members 111 and 113 has a reduced-diameter upper end 114 and a reduced-diameter lower end 115, each of these reduced-diameter ends 114 and 115 being provided with a radially outwardly extending short locking pin 116.

The clamp assembly 110 also includes two substantially identical and interchangeable cylindrical locking collars 120 which are respectively fitted over the upper and lower ends of the barrel 118 to hold the barrel members 111 and 113 together. More specifically, each of the locking collars 120 has a thin-walled cylindrical portion 121 which fits telescopically over the mated reduced-diameter ends 114 or 115 of the barrel 118. Each of the cylindrical portions 121 has a pair of diametrically opposed generally L-shaped slots 122 therein, for respectively receiving the pins 116, each of the slots 122 having an enlarged end 123 for seating the associated pin 116. Each of the locking collars 120 has a reduced-diameter inner surface 124 which is disposed in registry with the inner surface of the barrel 118 when the locking collars 120 are mounted in place thereon. Each of the locking collars 120 also has a frustoconical outer surface 125. The surface 125 on the lower one of the locking collars 120 is adapted for seating engagement with a complementary frustoconical surface 126 on the thimble 90 (FIG. 8).

In use, the clamp assembly 110 is utilized for coupling the drive tape 100 to the fiberoptic cable 151. In this assembly operation, the leading end of the fiberoptic cable 151 is fed upwardly through the mounting ring 87, the thimble 90 and the actuator tube 85 and thence upwardly through the guide tube 80. The attachment end 103 of the drive tape 100 has previously been threaded up through the guide tube 80 through the slot 104 therein and has been permanently attached to the barrel member 111. The fiberoptic cable 151 and the drive tape 100 are pulled up well above the upper end of the guide tube 80, and the barrel members 111 and 113 are then fitted around the fiberoptic cable 151 coaxially therewith to form the barrel 118.

Preferably, the barrel 118 has an inner diameter which is very slightly less than the outer diameter of the fiberoptic cable 151. Thus, when the locking collars 120 are mounted in place over the upper and lower ends of the barrel 118, they wedge the barrel members 111 and 113 together into clamping engagement with the fiberoptic cable 151. In this regard, each of the locking collars 120 is moved axially over the adjacent end of the barrel 118 with the pins 116 riding up into the axial portions of the slots 122. Then, the locking collars are rotated to move the pins 116 along the circumferential portions of the slots 122 and into the ends 123 thereof for locking the clamp assembly 110 in its assembled condition. In the event that the fiberscope probe 21 is of larger diameter than the fiberoptic cable 151, it may now be assembled and placed on the distal end thereof. Referring to FIGS. 8 and 9, it will be appreciated that the clamp assembly 110 is now telescopically receivable in the upper end of the guide tube 80 until it bottoms out on the thimble 90, this seating being cushioned by the spring 92.

The enclosure 31 is also provided with two mounting posts 127 respectively projecting from the top wall 36 and the side wall 34, each of the mounting posts 127 being provided with a rectangular coupling block 128 at its distal end. Two of the mounting posts 127 are provided so that the enclosure 31 can be mounted in two different orientations on the trolley 29. More specifically, the coupling block 128 is receivable in a complementary slot in a support block 129 carried by the trolley 29 (see FIG. 2). The coupling block 128 may then be locked in place in this mounted configuration by suitable locking means (not shown).

Referring now also to FIGS. 14-16 of the drawings, the optical unit 130 will now be described. The optical unit 130 includes a base plate 131 which is secured to the trolley 29. Fixedly secured to the base plate 131 is an elongated channel member 132 on which is mounted a box-like camera housing 133 provided with a cable connector 134. Mounted within the housing 133 is a closed-circuit video camera 135, which is preferably an Ultracon video camera. The camera 135 is provided at its rear end with a connector 136 to which is coupled a coaxial video cable 137 which extends around the camera 135 to the front or lower end of the housing 133, where it is coupled through a connector 138.

The video camera 135 is provided with a lens assembly 140, which preferably includes a 50 millimeter lens. The lens assembly 140 includes a focus ring 141, to which there is coaxially secured a sprocket 142. The sprocket 142 is coupled by a drive chain 143 to a sprocket 144 which is fixedly secured to the output shaft 145 of a reversible electric motor 146, mounted on a bracket 147 in the housing 133. Mounted forwardly of the lens assembly 140 is an adapter 148 which is supported on a yoke 149 carried by the housing 133. The adapter 148 coaxially couples the lens assembly 140 to one end of a fiberscope 150, which projects forwardly through an opening in the front or lower end of the housing 133. The fiberscope 150 is in turn coupled to one end of the fiberoptic cable 151. Optically coupled to the fiberscope 150 through a coupling 152 is a light tube 153 which extends to an adapter 154 on a light source 155 mounted on the camera housing 133. As can be seen best in FIG. 1, in use the optical unit 130 is mounted so that the optical axis 156 (see FIG. 15) of the lens assembly 140 is disposed vertically, i.e., parallel to the base plate 131.

Referring to FIG. 17, the fiberoptic cable 151 is preferably arranged with a central or axial image bundle 157 of optic fibers, surrounded by a plurality of equiangularly spaced apart light guide bundles 158, typically four in number. The image bundle 157 is optically coupled to the lens assembly 140, while the light guide bundles 158 are optically coupled through the coupling 152 and the light tube 153 to the light source 155. This arrangement offers significant advantages. The separate light guide bundles 158 provide a light supply which is dispersed and continuous, eliminating bright spots on one side or the other of the image bundle 157. This permits equally clear vision for 360° around the axis of the image bundle 157, without rotating the fiberscope probe 21.

Referring again to FIG. 1 of the drawings, the control trailer 160 includes a main control box assembly 161 which is coupled by a cable 162 to a computer 163. Typically, as in a sleeving operation for the tubes of a nuclear steam generating plant, the computer 163 may be arranged for controlling the sleeving operation. The main control box assembly 161 is also connected by a cable 164 to a power supply 165, which may in turn be coupled to an external source of power. A cable 166 couples the main control box assembly 161 to a remote fiberscope control box assembly 167, which includes a joystick unit 168. The main control box assembly 161 may also be coupled to a video monitor 169, which may in turn be coupled to a video tape recorder 170.

The main control box assembly 161 is coupled to the transport unit 30 and the optical unit 130 through a main control cable 171. More particularly, the main control cable 171 is fed through an electrical manifold 172, where it is split into a focus control cable 173 and a transport cable 174. The focus control cable 173 leads to the optical unit 130, being coupled thereto at the connector 134, while the transport cable 174 leads to the transport unit 30, being coupled thereto at the connector 38. The coaxial video cable 137 may be strapped to the focus control cable 173 and the main control cable 171.

The focus control cable 173 carries power for the light source 155 and for the video camera 135, and control signals for operating the motor 146 for focusing the lens assembly 140. The transport cable 174 carries power and control signals for operating the drive motor 43, the power being fed through the relay 99. The transport cable 174 also carries data signals from the Hall-effect sensor 54 to the main control box assembly 161. Light from the light source 155 is fed through the light tube 153 and the light guide bundles 158 of the fiberoptic cable 151 to the fiberscope probe 21 and the subject to be illuminated, the reflected image of the subject being fed through the probe 21 and the image bundle 157 of the fiberoptic cable 151 to the fiberscope 150, the lens assembly 140 and the video camera 135. The video signal from the camera 135 is fed over the coaxial cable 137 to the main control box assembly 161, and thence to the video monitor 169 and the video tape recorder 170.

In operation, the clamp assembly 110 is first coupled to the fiberoptic cable 151 in the manner described above, and the fiberscope probe 21 is mounted in place on the end of the fiberoptic cable 151. The transport unit 30 and the optical unit 130 are mounted in place on the trolley 29, which is located at a predetermined reference position along the support rail 28. The fiberoptic cable 151 is allowed to hang freely in a catenary between the transport unit 30 and the optical unit 130. The clamp assembly 110 is initially seated in the guide tube 80, in the rest position illustrated in FIG. 8. It will be appreciated that the trolley 29 is also remotely controllable from the control trailer 60 by means of a suitable control cable (not shown). Once the fiberoptic inspection system 20 is thus mounted in place, it remains in position in the primary chamber 25 of the vessel 22 throughout the entire sleeving operation, while the maintenance or inspection operation is being conducted. There is no further need for personnel to enter the vessel 22 and be exposed to radiation.

When it is desired to actuate the fiberoptic inspection system 20, the operator in the control trailer 160 operates the main control box assembly 161 for powering up the transport unit 30 and the optical unit 130. The positioning of the trolley 29 may be accomplished either manually or under the control of the computer 163. When the guide tube 80 is positioned beneath one of the tubes 27 to be inspected, the transport unit 30 is operated to insert the fiberscope probe 21 into the tube. This is accomplished by operating the drive motor 43 in a direction to rotate the drive sprocket 60 in a clockwise direction, as viewed in FIG. 2, thereby feeding the drive tape 100 from the magazine compartment 57, for carrying the clamp assembly 110 and the fiberoptic cable 151 axially upwardly into the selected tube 27. Because of the stiffness of the drive tape 100, it advances vertically from the guide tube 80 substantially as a support column for the flexible fiberoptic cable 151.

As the probe 21 is inserted into the tube 27, the linear movement thereof will be the same as that of the drive tape 100 fixed thereto. The linear movement of the drive tape 100 will, in turn, be directly proportional to the rotational movement of the drive sprocket 60 because of the positive non-slipping engagement of the drive sprocket 60 with the drive tape 100. As the drive sprocket 60 rotates there is a corresponding rotation of the vane 51. Each time one of the vane arms 52 passes the Hall-effect sensor 54, the sensor emits a signal. Since there are six arms 52 on the vane 51, each such signal represents a 60° rotation of the drive sprocket 60, which corresponds to a predetermined linear distance traveled by the drive tape 100.

These signals are detected by appropriate circuitry in the main control box assembly 161 for giving an indication of the distance traveled by the probe 21 from the reference position. This information, in connection with the control signal information regarding the direction in which the drive sprocket 60 is rotating, permits an accurate real-time on-line monitoring of the position of the fiberscope probe 21 with respect to a predetermined reference position. This permits completely automatic insertion and withdrawal of the fiberscope 21 under computer control, if desired. Even in the event of manual operation, this effectively eliminates operator error regarding the position of the fiberscope probe 21. The control of the direction and speed of rotation of the drive motor 43 may be effected by the joystick unit 168. Thus, for example, a forward movement of the joystick may operate the transport unit 30 for insertion of the probe 21, while a backward movement would operate the transport unit 30 for withdrawal of the probe 21.

The fiberoptic inspection system 20 also permits continuous remote control of the focusing of the lens assembly 140. This control may also be effected by the joystick unit 168. Thus, for example, a left-hand movement of the joystick could operate the drive motor 146 for moving the focus ring 141 in one direction, and a right-hand movement would operate it in the other direction.

When the fiberscope probe 21 is withdrawn from the tube 27, the clamp assembly 110 is completely retracted into the guide tube 80, as illustrated in FIG. 8, until it is seated on the thimble 90. The spring 92 will cushion this seating motion to avoid undue shock and possible damage to the fiberscope probe 21. It is a significant aspect of the invention, that when the clamp assembly 110 bottoms out on the thimble 90, it moves the thimble 90 downwardly against the urging of the compression spring 92, effecting a corresponding downward movement of the arm 93. This moves the leaf spring actuator 94 for actuating the switch 95 to control the relay 99 for deenergizing the drive motor 43 for a predetermined period of time, e.g., 30 seconds. This prevents overtravel of the motor 43, thereby obviating what would otherwise be a very difficult decision by the operator to select the precise time for deenergizing the motor.

It will be appreciated that the accurate monitoring of probe position afforded by the present invention can advantageously be utilized in connection with indicating signals on the main control box assembly 161. Thus, for example, actuation of the switch 95 upon complete withdrawal of the probe 21 could actuate a suitable indicator to signal that the probe 21 had been fully retracted. Similarly, the position signal as received from the Hall-effect sensor 54 can be compared with pre-programmed maps of the tube bundle and of individual tubes 27 to provide an indication when the probe 21 has reached a predetermined maximum desired depth of insertion.

While the preferred embodiment of the invention has been described in connection with a fiberoptic inspection system, it will be appreciated that several aspects of the invention are capable of much broader application. Thus, the transport unit 30 and, in particular, the concept of utilizing a drive tape for probe transport could be utilized for effecting movement of any kind of workpiece to and from a work area, where a workpiece is coupled to an elongated flexible carrier. Thus, for example, the transport unit 30 could be utilized for delivering other types of probes such as ultrasonic or eddy current probes, or could be utilized for transporting various types of tools, such as honing tools and the like.

Furthermore, the optical unit 130 could be utilized in other applications than fiberoptic inspection. The housing of the video camera 135, the lens assembly 140 and the light source 155 in a single self-contained unit makes it advantageous to use the optical unit 130 in various types of applications where remote control might be desired.

It will also be recognized that the cartridge 55 permits relatively quick and simple change of the drive tape 100. Thus, for example, several cartridges 55 could be provided, each carrying a different type of drive tape 100 for different applications as, for example, transporting different types of tools or for handling different types of workpiece carriers, other than fiberoptic cables. When it is desired to change applications, it is only necessary to remove the front wall 32 and the cartridge 55 and to demount the control tube 80 from the mounting bracket 81 to free the barrel member 111. The new cartridge is then mounted in place and the guide tube 80 remounted.

From the foregoing, it can be seen that there has been provided an improved fiberoptic inspection system which is compact in size, of simple and economical construction, and capable of remote control. More particularly, there has been provided a fiberoptic inspection system which permits delivery of the fiberoptic probe without frictional wear on the fiberoptic cable, permits accurate real-time monitoring of probe position, permits the fiberoptic inspection system to be continuously available for use at all times, and provides improved optical qualities.

We claim:

1. Apparatus for driving an elongated flexible carrier for carrying a workpiece to and from work areas, said apparatus comprising: a single elongated drive member having rigidity in one plane and being bendable out of said plane, coupling means carried by said single drive member adjacent to one end thereof for releasably coupling said drive member to the associated workpiece carrier, and drive means engageable with said single drive member for effecting longitudinal movement thereof and of the carrier coupled thereto; thereby to drive the carrier and the associated workpiece along a linear path.

2. The apparatus of claim 1, wherein the flexible carrier comprises a fiberoptic cable.

3. The apparatus of claim 1, wherein said drive member has a plurality of apertures therethrough equidistantly spaced apart longitudinally thereof, said drive means including a rotatable drive sprocket having radially outwardly extending teeth respectively receivable in said apertures for driving engagement with said drive member.

4. The apparatus of claim 1, and further including cartridge means containing a coiled supply portion of said drive member.

5. The apparatus of claim 1, and further including a guide tube adapted for receiving the workpiece carrier therethrough for guiding the longitudinal travel thereof, said guide tube having an aperture therein for accommodating said drive member, and cushioning means carried by said guide tube and engageable with said coupling means for preventing passage thereof through said tube and for cushioning the workpiece upon withdrawal thereof from a work area to said guide tube.

6. The apparatus of claim 1, and further including limit control means coupled to said drive means for controlling the actuation thereof, said limit control means including sensing means for sensing the withdrawal of the associated workpiece from a work area to a predetermined location, for deactuating said drive means.

7. The apparatus of claim 1, wherein said drive member comprises a steel tape.

8. The apparatus of claim 7, wherein said tape is arcuate in transverse cross section.

9. The apparatus of claim 1, and further including position detecting means including means for sensing the extent of linear travel of said drive member, thereby to indicate the position of the associated workpiece with respect to a reference position.

10. The apparatus of claim 9, wherein said sensing means includes a rotary means coupled to said drive means and rotatable thereby through an angle directly proportional to the linear distance of travel by said drive member, and Hall-effect switch means coupled to said rotary member for sensing the magnitude of the angular rotation thereof.

11. The apparatus of claim 1, wherein said coupling means includes clamping means disposable in encircling clamping engagement with the associated carrier.

12. The apparatus of claim 11, wherein said clamping means includes first and second clamping members cooperating to encircle the workpiece carrier, one of said clamping members being fixedly secured to said drive member, and locking means interconnecting said first and second clamping members and holding them in clamping engagement with the workpiece carrier.

13. The apparatus of claim 12, wherein each of said clamping members includes a laterally outwardly extending locking pin, said locking means including an annular collar receivable over said clamping members in wedging engagement therewith, said collar having slots respectively receiving said pins for locking said collar in engagement with said clamping members.

14. In a fiberoptic inspection system including an elongated flexible fiberoptic cable carrying a probe at one end thereof, the improvement comprising: image processing means optically coupled to the other end of the fiberoptic cable, movable image focusing means optically coupled to said image processing means, focus drive means coupled to said image focusing means for effecting focusing movement thereof, a transport unit, said transport unit including an elongated drive member having rigidity in one plane and being bendable out of said plane, coupling means carried by said drive member at one end thereof for coupling said drive member to the fiberoptic cable, and transport drive means coupled to said drive member for effecting longitudinal movement thereof and of the fiberoptic cable coupled thereto, thereby to drive the fiberoptic cable and the associated probe along a linear path; and remote control means coupled to said image processing means and to said transport unit for effecting operation of said focus drive means and said transport drive means.

15. The system of claim 14, wherein said image processing means and said image focusing means are part of a self-contained optical unit, said optical unit also including a light source optically coupled to the fiberoptic cable.

16. The system of claim 15, wherein said optical unit and said transport unit are mounted at spaced-apart positions on a common support, the portion of the fiberoptic cable extending between said optical unit and said transport unit hanging freely in a catenary.

17. In a fiberoptic inspection system including a fiberoptic cable having a probe connected to one end thereof, the improvement comprising: image processing means optically coupled to the fiberoptic cable at the other end thereof, movable image focusing means optically coupled to said image processing means, drive means coupled to said image focusing means for effecting focusing movement thereof, and control means coupled to said drive means for remotely controlling the operation thereof.

18. The system of claim 17, wherein said image focusing means has an optical axis and includes a control portion rotatable about said optical axis, said drive means including a drive motor having a rotatable output shaft, two sprockets respectively carried by said output shaft and said control portion for rotation respectively therewith, and continuous chain means interconnecting said sprockets for simultaneous rotation thereof.

19. The system of claim 17, wherein said drive motor comprises a reversible electric motor.

20. The system of claim 17, wherein image processing means and said image focusing means are part of a self-contained optical unit, said optical unit also including a light source optically coupled to said other end of the fiberoptic cable.

* * * * *